United States Patent
Lievens et al.

(10) Patent No.: US 9,994,752 B2
(45) Date of Patent: Jun. 12, 2018

(54) STABILIZATION OF HEXAGONAL BORON NITRIDE NANOPARTICLES

(71) Applicants: Serge Lievens, Merelbeke (BE); Vera Radojcic, Eke (BE); Sandip Agarwal, Arlington, MA (US); Michael Fuerstman, Arlington, MA (US)

(72) Inventors: Serge Lievens, Merelbeke (BE); Vera Radojcic, Eke (BE); Sandip Agarwal, Arlington, MA (US); Michael Fuerstman, Arlington, MA (US)

(73) Assignee: Arteco NV, Schoten (BE)

( * ) Notice: Subject to any disclaimer, the term of this patent is extended or adjusted under 35 U.S.C. 154(b) by 785 days.

(21) Appl. No.: 14/571,199

(22) Filed: Dec. 15, 2014

(65) Prior Publication Data

US 2016/0168442 A1 Jun. 16, 2016

(51) Int. Cl.
  *C09K 5/04* (2006.01)
  *C09K 5/10* (2006.01)
(52) U.S. Cl.
  CPC ..................................... *C09K 5/10* (2013.01)
(58) Field of Classification Search
  CPC ........ C09K 8/592; C09K 8/584; C09K 5/063; C09K 5/14; C09K 5/10; C09K 2208/10; C09K 8/03; C09K 19/388
  See application file for complete search history.

(56) References Cited

U.S. PATENT DOCUMENTS

| 7,812,114 | B2 | 10/2010 | Falk et al. |
| 9,150,771 | B2 | 10/2015 | Mazyar et al. |
| 2012/0034464 | A1 | 2/2012 | Chakraborty et al. |
| 2013/0043028 | A1* | 2/2013 | Chakraborty ............ C09K 8/03 166/302 |
| 2013/0200299 | A1* | 8/2013 | Mazyar ................. E21B 43/128 252/75 |
| 2014/0077138 | A1* | 3/2014 | Taha-Tijerina ........ H01B 3/002 252/572 |
| 2014/0212587 | A1 | 7/2014 | Malshe |

OTHER PUBLICATIONS

Choi, Stephen U.S. and Eastman, J.A., "Enhancing Thermal Conductivity of Fluids with Nanoparticles", Papers for ASME International Mechanical Engineering Congress & Exposition, Oct. 1995.
Lee, S., et al., "Measuring Thermal Conductivity of Fluids Containing Oxide Nanoparticles", Journal of Heat Transfer, v. 121, 1999, pp. 280-289.
International Search Report from corresponding PCT Application PCT/US2015/065605, dated Apr. 21, 2016.
Barry, A. P. and Nicolas P.E. Barry, "Pluronic® block-copolymers in medicine; from chemical and biological versatility to rationalisation and clinical advances" Polymer Chemistry, 2014, 5:3291-3297.

* cited by examiner

*Primary Examiner* — John R Hardee
(74) *Attorney, Agent, or Firm* — Melissa M. Hayworth; E. Joseph Gess

(57) ABSTRACT

A composition includes a continuous phase of water, alcohol, or a mixture of water and alcohol; hexagonal boron nitride nanoparticles dispersed in the continuous phase; and a compound having a formula (I)

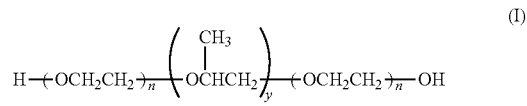

or a salt thereof, wherein n is an integer between 50 and 200 and y is an integer between 20 and 200.

20 Claims, No Drawings

STABILIZATION OF HEXAGONAL BORON NITRIDE NANOPARTICLES

FIELD OF TECHNOLOGY

This disclosure relates to stabilized compositions which comprise hexagonal boron nitride nanoparticles.

INTRODUCTION

Heat transfer fluids are used in many applications, particularly as coolants or antifreeze. Examples of use of heat transfer fluids include the removal or exchange of excess heat from stationary and automotive internal combustion engines, heat generated by electrical motors and generators, process heat and condensation heat (e.g., in refineries and steam generation plants), heat from electronic equipment, or heat generated in fuel cell systems. In each application, thermal conductivity and heat capacity of the heat transfer fluid is important.

Historically, water has been the preferred fluid when considering heat transfer. However, water is often mixed with freezing point depressants (e.g., alcohols like glycols or salts) to obtain antifreeze properties. Compared to pure water, these mixtures have a decreased heat transfer capability, but are still preferred over liquids like organic oils, silicone oil, or synthetic esters.

Heat transfer fluids with higher thermal conductivities are desirable. Although water based and water/glycol based fluids dominate the market, they do not always give sufficient heat transfer performance. In particular, energy efficient applications and equipment require the development of heat transfer fluids with significantly higher thermal conductivities than are presently available. Fluids with suspended solids can exhibit higher thermal conductivities. Solids have greater thermal conductivities than fluids. For example, the solids copper, aluminum, copper oxide and silicon oxide have respectively thermal conductivities of 401 W/m·K, 237 W/m·K, 76.5 W/m·K and 1.38 W/m·K, respectively. In contrast, the fluids water, monoethylene glycol, and typical oil have thermal conductivities of 0.613 W/m·K, 0.252 W/m·K, and 0.107 W/m·K, respectively. Many theoretical and experimental studies of the effective thermal conductivities of dispersions that contain solid particles have been conducted since Maxwell's theoretical work published in 1881.

The incorporation of nanoparticles into fluids can provide higher thermal conductivities. The use of nanoparticles was proposed in fluids such as water, ethylene glycol, and engine oil to produce a new class of engineered fluids (nanofluids) with improved heat transfer capabilities. See S. U.-S. Choi, ASME Congress, San Francisco, Calif., Nov. 12-17, 1995. Thermal conductivity measurements on fluids containing $Al_2O_3$ and CuO nanoparticles have been reported. See S. U.-S. Choi et al., ASME Transactions 280, Vol. 121, May 1999. Nanofluids, containing only a small amount of nanoparticles, have substantially higher thermal conductivities compared to the same fluids without nanoparticles.

However, the poor stability of the dispersed nanoparticles, including hexagonal boron nitride nanoparticles, has impeded the application of nanofluids as heat transfer fluids. Thus far, studies relating to stability have focused on the selection of particle size and particle size distribution and dispersion techniques.

SUMMARY

Disclosed herein are stable compositions containing hexagonal boron nitride nanoparticles, methods of preparing the stabilized compositions, and methods of exchanging heat utilizing the compositions as heat transfer fluids.

In a first embodiment, a composition comprises a continuous phase selected from the group consisting of water, alcohol, and a mixture of water and alcohol; hexagonal boron nitride nanoparticles dispersed in the continuous phase; and a compound having a formula (I)

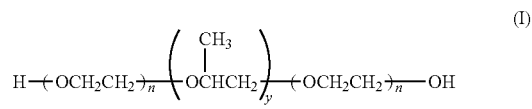

or a salt thereof, wherein n is an integer between 50 and 200 and y is an integer between 20 and 200.

In a second embodiment, a composition comprises a continuous phase of water; hexagonal boron nitride nanoparticles dispersed in the continuous phase; and a compound having a formula (I)

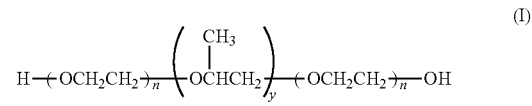

or a salt thereof, wherein n is an integer between 50 and 200 and y is an integer between 20 and 200.

In one embodiment, a method of exchanging heat comprises a. generating heat in an automotive internal combustion engine; b. passing a stream through one side of a heat exchanger; c. passing a composition through another side of the heat exchanger; and d. transferring the heat from the stream to the composition in the heat exchanger. In the method, the composition comprises a continuous phase selected from the group consisting of water, alcohol, and a mixture of water and alcohol; hexagonal boron nitride nanoparticles dispersed in the continuous phase; and a compound having a formula (I)

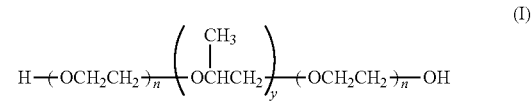

or a salt thereof, wherein n is an integer between 50 and 200 and y is an integer between 20 and 200.

DETAILED DESCRIPTION

As used herein, the singular forms "a," "an," and "the" include plural referents unless the context clearly dictates otherwise.

In a first embodiment, a composition comprises a continuous phase selected from the group consisting of water, alcohol, and a mixture of water and alcohol; hexagonal boron nitride nanoparticles dispersed in the continuous phase; and a compound having a formula (I)

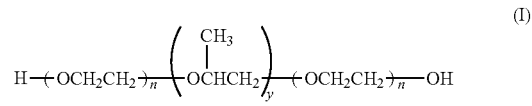

or a salt thereof, wherein n is an integer between 50 and 200 and y is an integer between 20 and 200.

In a second embodiment, a composition comprises a continuous phase of water; hexagonal boron nitride nanoparticles dispersed in the continuous phase; and a compound having a formula (I)

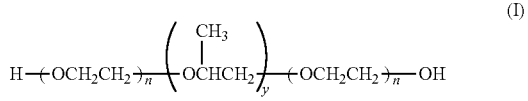
$$H\text{—}(OCH_2CH_2)_n\text{—}(OCHCH_2)_y\text{—}(OCH_2CH_2)_n\text{—}OH \quad (I)$$
with CH$_3$ on the middle block or a salt thereof, wherein n is an integer between 50 and 200 and y is an integer between 20 and 200.

The compound having the formula (I) is a triblock copolymer having a central hydrophobic block of polypropylene glycol surrounded by hydrophilic blocks of polyethylene glycol. The present inventors have observed that fluids containing hexagonal boron nitride nanoparticles exhibit increased thermal conductivity, but are not suitably stable at high temperatures typically encountered in heat transfer applications, for example, between about 70° C. and about 110° C. or between about 85° C. and about 110° C. The present inventors have discovered that incorporation of the triblock copolymer having a central hydrophobic block of polypropylene glycol surrounded by hydrophilic blocks of polyethylene glycol into a water based, an alcohol based, or a water/alcohol based continuous phase containing dispersed hexagonal boron nitride nanoparticles can stabilize the dispersion of hexagonal boron nitride nanoparticles in the continuous phase at room temperature and at elevated temperatures. Thus, incorporation of the triblock copolymer can provide a composition having not only substantial thermal conductivity, but also improved stability, making it suitable for use as a heat transfer fluid.

For example, the composition can be stable for 12 hours at room temperature. As another example, the composition can be stable for 12 hours at a temperature between about room temperature and about 85° C. As yet another example, the composition can be stable for 12 hours at a temperature between about 70° C. and about 110° C. or between about 85° and about 110° C.

Suitable salts of the compound having the formula (I) include alkali metal, ammonium, and amine salts.

The composition generally contains a major amount (i.e., at least 80 vol %) of the continuous phase (i.e., water, alcohol, or a mixture water and alcohol). In one embodiment, the composition contains at least 85 vol % of the continuous phase. In another embodiment, the composition contains at least 90 vol % of the continuous phase. In a further embodiment, the composition contains at least 95 vol % of the continuous phase.

Alcohol acts as a freezing point depressant if antifreeze properties are desired. When the continuous phase is alcohol or a mixture of water and alcohol, the alcohol may be a glycol. The glycol may be ethylene glycol, diethylene glycol, propylene glycol, dipropylene glycol, triethylene glycol, tetraethylene glycol, pentaethylene glycol, hexaethylene glycol, dipropylene glycol, tripropylene glycol, tetrapropylene glycol, pentapropylene glycol, hexapropylene glycol, mono ethylene glycol, or mono propylene glycol. The alcohol may alternatively be selected from methanol, ethanol, propanol, butanol, furfurol, tetrahydrofurfuryl, ethyoxylated furfuryl, dimethyl ether of glycerol, sorbitol, 1,2,6 hexanetriol, trimethylolpropane, methoxyethanol, and glycerin. In one embodiment, methanol, ethanol, propanol, butanol, furfurol, tetrahydrofurfuryl, ethoxylated furfuryl, ethylene glycol, diethylene glycol, triethylene glycol, 1,2-propylene glycol, 1,3-propylene glycol, dipropylene glycol, butylene glycol, glycerol, monoethylether of glycerol, dimethylether of glycerol, sorbitol, 1,2,6-hexanetriol, trimethylolpropane, methoxyethanol, or mixtures thereof are utilized.

In a particular embodiment, the continuous phase is a mixture of water and ethylene glycol. In another particular embodiment, the continuous phase is a mixture of water and ethylene glycol in a ratio of 50/50 vol %.

The hexagonal boron nitride nanoparticles are cylindrical in shape and their size can vary. Due to the cylindrical shape of the hexagonal boron nitride nanoparticles, their height in combination with their radius or diameter describes their size. For example, the hexagonal boron nitride nanoparticles can have an average diameter between about 50 nm and about 350 nm and an average height between about 5 nm and about 20 nm. As another example, the hexagonal boron nitride nanoparticles can have an average sheet height between about 5 nm and about 20 nm and an average sheet radius between about 50 nm and about 350 nm.

The concentration of the hexagonal boron nitride nanoparticles in the composition can vary. In one embodiment, the hexagonal boron nitride nanoparticles are present in the composition in a concentration between about 0.0001 vol % and about 10 vol %. In another embodiment, the hexagonal boron nitride nanoparticles are present in the composition in a concentration between about 0.005 vol % and about 0.5 vol %. In yet another embodiment, the hexagonal boron nitride nanoparticles are present in the composition in a concentration between about 0.05 vol % and about 0.2 vol %.

In the compound having the formula (I), in one embodiment, n is an integer between 80 and 120 and y is an integer between 50 and 75. In a particular embodiment, n is 100 and y is 65.

The concentration of the compound having the formula (I) in the composition can vary. In one embodiment, the compound having the formula (I) is present in the composition in a concentration between about 0.0001 vol % and about 1 vol %. In another embodiment, the compound having the formula (I) is present in the composition in a concentration between about 0.2 vol % and about 0.7 vol %. In a particular embodiment, the compound having the formula (I) is present in the composition in a concentration of about 0.1 vol %.

Neither the thermal conductivity nor the thermal capacity of the composition is significantly impacted by the presence of a small amount of common additives. Appropriate additives include an alkali metal salt as a freezing point depressant, a corrosion inhibitor, a scale inhibitor, a stabilizer, an antioxidant, a buffer, a de-foamer, a dye, or a mixture thereof. The composition may contain one or more additives for a total additive amount of about 0.01 wt % to about 10 wt %. For example, one or more corrosion inhibitors may be present in the composition in a concentration between about 0.2 wt % and about 10 wt %. Examples of alkali metal salts include a salt of an acid or mixture of acids selected from the group consisting of acetic acid, propionic acid, succinic acid, betaine and mixtures thereof. Examples of corrosion inhibitors include an aliphatic carboxylic acid or a salt thereof, an aromatic carboxylic acid or a salt thereof, a triazole, a thiazole, a silicate, a nitrate, a nitrite, a borate, a phosphate molybdate, or an amine salt. Examples of antioxidants include phenols, such as 2,6-di-t-butyl methylphenol and 4,4'-methyl-ene-bis(2,6-di-t-butylphenol); aromatic amines, such as p,p-dioctylphenylamine, monooctyldiphenylamine, phenothiazine, 3,7-ioctylphenothiazine, phenyl-1-naphthylamine, phenyl-2-naphthylamine, alkylphenyl-1-naphthatalamines and alkyl-phenyl-2-naphthal-amines, as well as sulphur-containing compounds, e.g. dithiophosphates, phosphites, sulphides and dithiometal salts, such as benzothiazole, tin-dialkyldithiophosphates and zinc diaryldithiophosphates.

The pH of the composition may be between about 7 and about 11.5. In one embodiment, the pH of the composition is between about 8.5 and about 10.5.

The composition can be prepared by dispersing the hexagonal boron nitride nanoparticles in the continuous phase (i.e., water, alcohol, or a mixture of water and alcohol). The hexagonal boron nitride nanoparticles may be dispersed either prior to or after adding the compound having the formula (I) to the continuous phase. Any means known in the art for dispersion of the hexagonal boron nitride nanoparticles may be used. In one embodiment, the nanoparticles are dispersed by sonication.

Also disclosed herein is a method of exchanging heat utilizing a composition as disclosed herein as a heat transfer fluid. The method of exchanging heat comprises passing a stream through one side of a heat exchanger; passing a composition as disclosed herein through another side of the heat exchanger; and transferring the heat from the stream to the composition in the heat exchanger. In one embodiment, the method further comprises generating the heat in an automotive internal combustion engine. In another embodiment, the method further comprises generating the heat in a stationary internal combustion engine. In yet another embodiment, the method further comprises generating the heat in an electrical motor or generator. In a further embodiment, the method further comprises generating the heat by condensation or a chemical reaction, for example, in a refinery, a steam generation plant, or a fuel cell.

EXAMPLES

Preparation of Nanofluids

Nanofluids containing dispersed hexagonal boron nitride nanoparticles were prepared in Examples 5-8 and Comparative Examples 1-4 and 9-11. Micron-sized hexagonal boron nitride particles were added to isopropanol and sonicated for 1 hour. The hexagonal boron nitride particles were then centrifuged at 2000 RPM for 10 minutes. Non-exfoliated particles were separated at the bottom. Exfoliated hexagonal boron nitride nanoparticles in the isopropanol were filtered and dried. The hexagonal boron nitride nanoparticles were re-dispersed in an ethylene glycol/water solution (50/50 vol %) either with or without sonication and either with or without the following triblock copolymer:

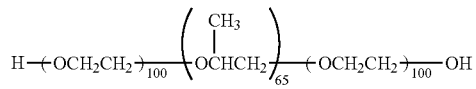

Comparative Example 1

A nanofluid was prepared with 0.1 vol % hexagonal boron nitride nanoparticles in an ethylene glycol/water solution (50/50 vol %).

Comparative Example 2

A nanofluid was prepared with 0.05 vol % hexagonal boron nitride nanoparticles in an ethylene glycol/water solution (50/50 vol %).

Comparative Example 3

A nanofluid was prepared with 0.2 vol % hexagonal boron nitride nanoparticles in an ethylene glycol/water solution (50/50 vol %).

Comparative Example 4

A nanofluid was prepared with 0.5 vol % hexagonal boron nitride nanoparticles in an ethylene glycol/water solution (50/50 vol %).

Example 5

A nanofluid was prepared with 0.1 vol % hexagonal boron nitride nanoparticles and 0.1 vol % triblock copolymer in an ethylene glycol/water solution (50/50 vol %) by sonication.

Example 6

A nanofluid was prepared with 0.1 vol % hexagonal boron nitride nanoparticles and 0.2 vol % triblock copolymer in an ethylene glycol/water solution (50/50 vol %) by sonication.

Example 7

A nanofluid was prepared with 0.05 vol % hexagonal boron nitride nanoparticles and 0.1 vol % triblock copolymer in an ethylene glycol/water solution (50/50 vol %) by sonicatrion.

Example 8

A nanofluid was prepared with 0.2 vol % hexagonal boron nitride nanoparticles and 0.1 vol % triblock copolymer in an ethylene glycol/water solution (50/50 vol %) by sonication.

Comparative Example 9

A nanofluid was prepared with 0.1 vol % hexagonal boron nitride nanoparticles in an ethylene glycol/water solution (50/50 vol %) by sonication.

Comparative Example 10

A nanofluid was prepared with 0.2 vol % hexagonal boron nitride nanoparticles in an ethylene glycol/water solution (50/50 vol %) by sonication.

Comparative Example 11

A nanofluid was prepared with 0.2 vol % hexagonal boron nitride nanoparticles in a Halvoline® XLC/water solution (50/50 vol %) by sonication.

Stability Tests

The nanofluids were stored both at room temperature and at 85° C. and their stabilities were observed visually after 12 hours at both temperatures. The stabilities of the nanofluids are set forth in the table below. The term "stable" means that no precipitate was observed. The term "not stable" means that precipitate was observed in the container containing the nanofluid.

| Example | Conc. of nanoparticles (vol %) | Conc. of triblock copolymer (vol %) | Continuous Phase | Sonication | Stability at room temperature | Stability at 85° C. |
|---|---|---|---|---|---|---|
| Comparative Example 1 | 0.1 | N/A | ethylene glycol/water solution (50/50 vol %) | no | not stable | not stable |
| Comparative Example 2 | 0.05 | N/A | ethylene glycol/water solution (50/50 vol %) | no | not stable | not stable |
| Comparative Example 3 | 0.2 | N/A | ethylene glycol/water solution (50/50 vol %) | no | not stable | not stable |
| Comparative Example 4 | 0.5 | N/A | ethylene glycol/water solution (50/50 vol %) | no | not stable | not stable |
| Example 5 | 0.1 | 0.1 | ethylene glycol/water solution (50/50 vol %) | yes | stable | stable |
| Example 6 | 0.1 | 0.2 | ethylene glycol/water solution (50/50 vol %) | yes | stable | stable |
| Example 7 | 0.05 | 0.1 | ethylene glycol/water solution (50/50 vol %) | yes | stable | stable |
| Example 8 | 0.2 | 0.1 | ethylene glycol/water solution (50/50 vol %) | yes | stable | not stable |
| Comparative Example 9 | 0.1 | N/A | ethylene glycol/water solution (50/50 vol %) | yes | not stable | not stable |
| Comparative Example 10 | 0.2 | N/A | ethylene glycol/water solution (50/50 vol %) | yes | not stable | not stable |
| Comparative Example 11 | 0.2 | N/A | commercial coolant solution (50/50 vol %) | yes | not stable | not stable |

The results in the table show the triblock copolymer stabilized the dispersions of hexagonal boron nitride nanoparticles in the nanofluids of Examples 5-7 at both room temperature and at an elevated temperature of 85° C. and the dispersion of hexagonal boron nitride nanoparticles in the nanofluid of Example 8 at room temperature. In contrast, the nanofluids of Comparative Examples 1-4 and 9-11 without the triblock copolymer were not stable both at room temperature and 85° C.

While the composition and methods disclosed herein have been described with reference to specific embodiments, this application is intended to cover those various changes and substitutions that may be made by those of ordinary skill in the art without departing from the spirit and scope of the appended claims.

What is claimed is:

1. A composition, comprising:
   a continuous phase selected from the group consisting of water, alcohol, and a mixture of water and alcohol;
   hexagonal boron nitride nanoparticles dispersed in the continuous phase;
   a compound having a formula (I)

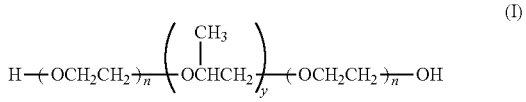

or a salt thereof, wherein n is an integer between 50 and 200 and y is an integer between 20 and 200; and
   optionally an additive.

2. The composition according to claim 1, wherein n is an integer between 80 and 120 and y is an integer between 50 and 75.

3. The composition according to claim 1, wherein n is 100 and y is 65.

4. The composition according to claim 1, wherein the hexagonal boron nitride nanoparticles have an average sheet height between about 5 nm and about 20 nm and an average sheet radius between about 50 nm and about 350 nm.

5. The composition according to claim 1, wherein the hexagonal boron nitride nanoparticles have an average diameter between about 50 nm and about 350 nm and an average height between about 5 nm and about 20 nm.

6. The composition according to claim 1, wherein the continuous phase is water and ethylene glycol.

7. The composition according to claim 1, wherein the continuous phase is water and ethylene glycol in a ratio of 50/50 vol %.

8. The composition according to claim 1, wherein the composition further comprises the additive.

9. The composition according to claim 8, wherein the additive is selected from the group consisting of an alkali metal salt as a freezing point depressant, a corrosion inhibitor, a scale inhibitor, a stabilizer, an antioxidant, a buffer, a de-foamer, a dye, and mixtures thereof.

10. The composition according to claim 9, wherein the corrosion inhibitor is selected from the group consisting of an aliphatic carboxylic acid or a salt thereof, an aromatic carboxylic acid or a salt thereof, a triazole, a thiazole, a silicate, a nitrate, a nitrite, a borate, a phosphate molybdate, an amine salt, and mixtures thereof.

11. The composition according to claim 9, wherein the corrosion inhibitor is present in the composition in a concentration between about 0.2 wt % and about 10 wt %.

12. The composition according to claim 1, wherein the composition is stable for 12 hours at room temperature.

13. The composition according to claim 1, wherein the composition is stable for 12 hours at a temperature between about room temperature and about 85° C.

14. The composition according to claim 1, wherein the hexagonal boron nitride nanoparticles are present in the composition in a concentration between about 0.0001 vol % and about 10 vol %.

15. The composition according to claim 14, wherein the hexagonal boron nitride nanoparticles are present in the composition in a concentration between about 0.005 vol % and about 0.5 vol %.

16. The composition according to claim 15, wherein the hexagonal boron nitride nanoparticles are present in the composition in a concentration between about 0.05 vol % and about 0.2 vol %.

17. The composition according to claim 1, wherein the compound having the formula (I) is present in the composition in a concentration between about 0.0001 vol % and about 1 vol %.

18. The composition according to claim 17, wherein the compound having the formula (I) is present in the composition in a concentration between about 0.2 vol % and about 0.7 vol %.

19. The composition according to claim 1, wherein the continuous phase is water.

20. A method of exchanging heat, comprising:
a. generating heat in an automotive internal combustion engine;
b. passing a stream through one side of a heat exchanger;
c. passing a composition through another side of the heat exchanger; and
d. transferring the heat from the stream to the composition in the heat exchanger, wherein the composition comprises:
a continuous phase selected from the group consisting of water, alcohol, and a mixture of water and alcohol;
hexagonal boron nitride nanoparticles dispersed in the continuous phase;
a compound having a formula (I)

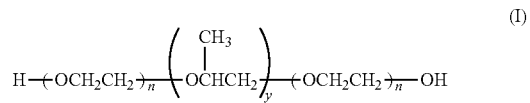

or a salt thereof, wherein n is an integer between 50 and 200 and y is an integer between 20 and 200; and
optionally an additive.

* * * * *